Nov. 2, 1965     C. I. HIBNER     3,215,175
APPARATUS FOR MAKING ARCUATE MOLDING STRIPS
Filed Aug. 5, 1963     3 Sheets-Sheet 1

INVENTOR.
CARL I. HIBNER
BY Fishburn and Gold
ATTORNEYS

INVENTOR.
CARL I. HIBNER

Nov. 2, 1965   C. I. HIBNER   3,215,175
APPARATUS FOR MAKING ARCUATE MOLDING STRIPS
Filed Aug. 5, 1963   3 Sheets-Sheet 3

INVENTOR.
CARL I. HIBNER
BY
Fishburn and Gold
ATTORNEYS

United States Patent Office 3,215,175
Patented Nov. 2, 1965

3,215,175
APPARATUS FOR MAKING ARCUATE
MOLDING STRIPS
Carl I. Hibner, Box 127, Raymore, Mo.
Filed Aug. 5, 1963, Ser. No. 299,697
10 Claims. (Cl. 144—154)

This invention relates to the making of moldings and the like used in buildings and cabinets, and more particularly to a method of and apparatus for cutting or shaping arcuate molding strips from wood blanks.

While straight molding strips of various cross-sectional shapes have been available and can be applied to cabinets and the like and connected at adjacent ends by mitered joints to provide square corners, the making of arcuate or rounded corners or connections between strips has presented many difficulties in the manufacture of the arcuate pieces, and heretofore operations have been expensive and there have been substantial losses of the finished pieces due to breakage and the like. It is desirable to have the arcuate molding strips substantially ¼ of a circle with the end faces parallel whereby the arcuate strip may be positioned between ends of strips that are at right angles to each other with the end surfaces of said right angular positioned strips cut on a 45-degree angle so that the arcuate strip and the right angular positioned straight strips are joined with mitered ends. Heretofore, such arcuate molding strips have been cut cross-wise of the grain to provide strength and reduce breaking of the small end portions on the inside of the curve, but such an arrangement still resulted in fragile pieces that could break in handling.

The present invention includes apparatus to automatically handle wood blanks and cut or machine same to desired cross-sectional shape and arcuate form on a desired radius and discharge the arcuate strips which are then cut to the desired length with the ends in parallel planes whereby the strip is substantially a quarter of a circle and the ends mate with mitered ends of straight strips to be connected thereby.

The principal objects of the present invention are to provide an apparatus that will produce this work quickly and effectively with a minimum of hand labor and expense; to provide a machine wherein it is necessary only to cut wood blanks in a rectangular shape and place same in a stack to be fed onto a table or carrier, the feeding, holding, cutting and ejection of the blanks and the strips made therefrom being performed entirely automatically; to provide for the manufacture of arcuate molding strips with the shaping and cutting to size with the grain running toward both ends whereby the cutting or shaping is with the grain, producing a smoothly finished strip that is thereafter cut to length with substantially no breakage; to provide such a machine that has a continuously rotating support or table mounted on a vertical axis with means for receiving blanks at spaced intervals for movement therewith; to provide such a machine wherein the blanks are held, machined and then the shaped molding discharged therefrom; and to provide an apparatus for the making or arcuate molding strips with a smooth finished surface having improved appearance and strength at low cost.

Other objects and advantages of this invention will become apparent from the following description taken in connection with the accompanying drawings wherein are set forth by way of illustration and example certain embodiments of this invention.

Figure 1:
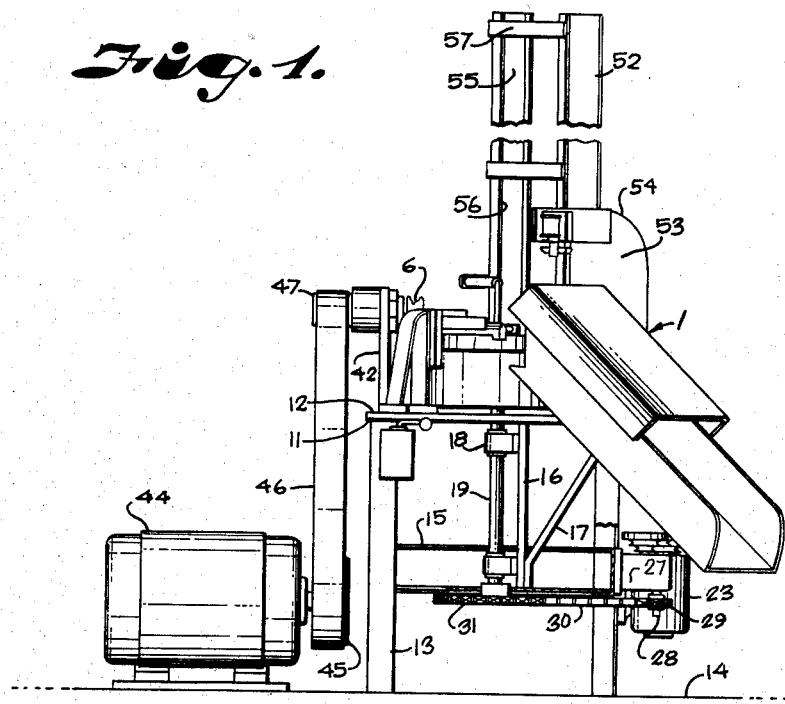
FIG. 1 is a side elevation of a machine for cutting an arcuate molding strip.
Figure 8:
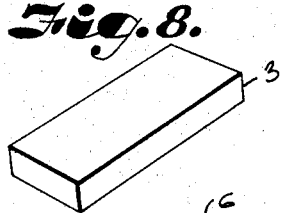
FIG. 8 is a diagrammatic perspective of a blank.
Figure 9:
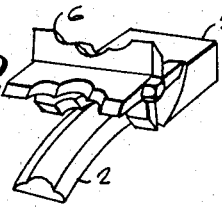
FIG. 9 is a diagrammatic view of the blank being cut to the desired radius and cross-section.
Figure 7:
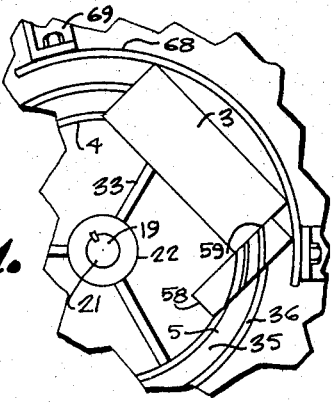
FIG. 7 is a partial plan view of the carrier with a blank positioned thereon immediately after being received from the hopper.
Figure 11:
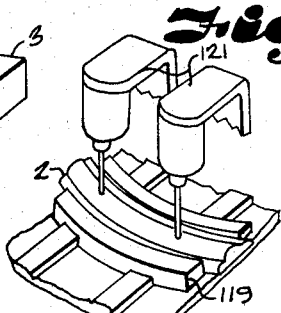
FIG. 11 is a diagrammatic perspective view showing the drilling of holes in the strip.

Referring more in detail to the drawings:

The reference numeral 1 generally designates a machine for cutting and shaping arcuate molding strips 2 from blanks 3 of wood or the like. The major moving element of the machine is a carrier or table 4 having a blank-receiving portion or surface 5 that is generally circular and horizontally disposed and mounted for rotation about a fixed vertical axis. Upon this table are successively placed the rectangular blanks 3 to be cut and the table is revolved so that these blanks are presented one after the other to a cutter generally indicated at 6 for cutting and shaping the top and side surfaces of the molding strip 2. The molding strip may have any suitable cross-sectional shape but since it usually is mated with straight strips on cabinets and the like, it should have the same cross-sectional shape as the strips with which it is to be used. In the illustrated structure, the strip has a flat bottom 7, side edges 8 and 9 that are segments of concentric circles, and a top contour 10 to define the desired shape.

In the machine structure illustrated, there is a skeleton frame 11 having a horizontal platform 12 that is illustrated as being square, said platform being supported at its corners by legs 13 adapted to rest on a floor 14 or other suitable supporting surface. The legs 13 are preferably connected by transverse frame members 15 extending therebetween to form a rigid structure. The frame includes an upright member 16 having a brace 17 and mounting vertically spaced bearings 18 to rotatably mount a shaft 19 which extends through an aperture 20 in the platform 12 to provide an upwardly extending portion 21 to which a hub 22 of the carrier 4 is fixed. The arcuate moldings strips may be of any radius; however, usually, the median radius will be in the nature of two to eight inches. The rotation of the carrier is the feed to the cutter, and it is preferred that the rotation be a slow speed in order to provide a good finish and reduce breakage. In the structure illustrated, the table is rotated by an operative drive connection with a motor 23 which, in the illustrated structure, has a pulley 24 driven thereby and operatively connected by a belt 25 to a pulley 26 driving a speed reduction mechanism in a housing 27. The motor 23 and housing 27 are secured to a transverse frame member 15 and a driven shaft 28 from the speed reducer has a sprocket 29 operatively connected by a chain 30 to a sprocket 31 fixed on the shaft 19. The chain and sprocket arrangement preferably provides a further reduction whereby the table or carrier is rotated in the nature of 3 r.p.m.

The table or carrier in the structure illustrated has a cylindrical portion 32 fixed to the hub 22 by spokes 33. An enlarged ring portion 34 is fixed on the upper edge of the cylindrical portion 32. The ring portion 34 preferably has a width slightly less than the width of the finished or cut molding strip 2, and the upper surface 5 has a recessed central portion 35 to provide radially spaced coplanar surfaces 36 to be engaged by the bottom surface 7 of the blank 3. In the portions of the carrier 4 that are to receive the blanks, there are upstanding projections 37 fixed in the recessed portion 35, said projections extending to a level slightly above that of the surfaces 36 whereby they will extend into the blank to be received thereon and aid in retaining the blank in position.

The cutter 6 is rotatably mounted and positioned above the ring portion 34 and has cutting blades 38 with a contour 39 substantially conforming to the shape of the edges 8 and 9 and the surface 10 of the molding strip. The cutter 6 is fixed on a shaft 40 rotatably mounted in a bearing structure 41 supported on a bracket 42 that extends upwardly from the platform 12. The bearing 41 is preferably held in adjusted position on the bracket 42 by bolts 43 whereby the axis of the rotation of the cutter 6 is spaced above the surfaces 36 the proper amount so that the blade's contour will cut the proper contour on the molding strip and leave the thickness from the surface 7 to the surface 10 the proper amount. The cutter, in the illustrated structure, is driven by a motor 44 mounted on the floor support 14 which drives a pulley 45 that is operatively connected by a belt 46 to a pulley 47 fixed on the shaft 40. It is preferred that the cutter be driven at a relatively high speed, as for example 15,000 r.p.m., to suitably cut the wood blank and provide a smooth finish thereon.

Figure 4:
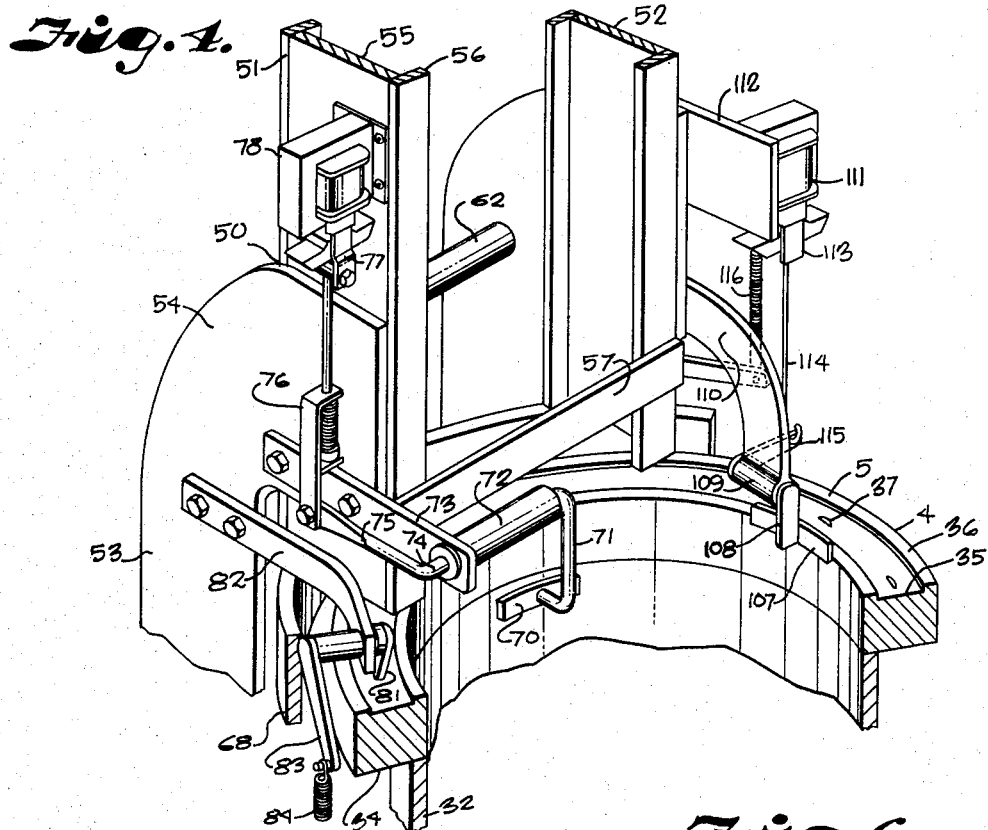
FIG. 4 is a partial perspective view of the rotatable carrier, blank hopper and positioning members.
Figure 5:
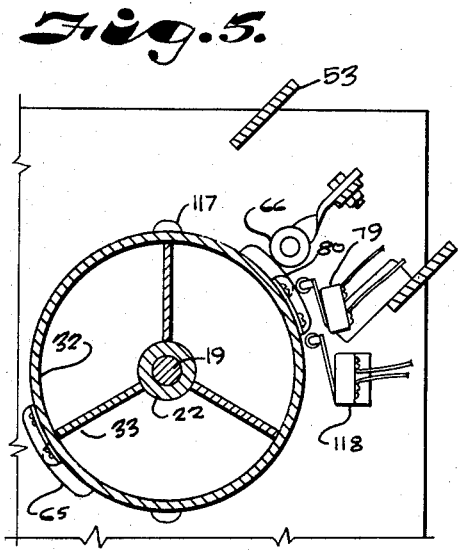
FIG. 5 is a partial horizontal sectional view through the rotating carrier and sequential timing mechanism.
Figure 6:
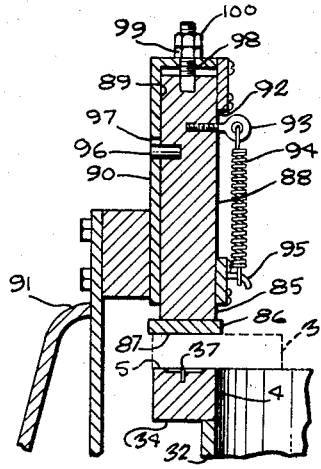
FIG. 6 is a partial vertical sectional view through the carrier and a blank hold-down.

The machine preferably has a feed position 48, a cutting position where the cutter 6 is located, and a discharge position 49, that are spaced circumferentially of the table. In the structure illustrated, two blanks are processed on each revolution of the table or carrier. In the structure illustrated, the feeding of the blanks to the carrier is provided by arranging the blanks 3 in a hopper 50 which consists of spaced channel-like members 51 and 52 supported above one side of the carrier 4 by spaced support plates or frames 53 that have their lower ends fixed on the platform 12 in radially outwardly spaced relation to the carrier with the upper ends turned inwardly as to 54 to extend over the carrier 4. The hopper members 51 and 52 are fixed to the frame members 53 with the webs 55 substantially parallel and the flanges 56 extending inwardly as illustrated in FIG. 4. The flanges of the channel hopper members 51 and 52 are preferably connected by transverse ties or braces 57 to hold the channel members in suitably spaced relation to define a path for the blanks so that the blanks may be stacked and slide freely down the ways defined by the webs 55 and flanges 56. The lower edges of the channel members 51 and 52 are preferably spaced above the surface 36 of the carrier whereby when the blank is deposited on the carrier it will move therewith and have suitable clearance under the hopper.

The projections 37 are at the blank-receiving position on the carrier and at the trailing end of each of these positions are pusher blocks 58 that are fixed on the ring member 34 and extend across the upper face thereof whereby the leading edge 59 will engage a blank trailing edge when said blank is deposited in the respective position on the carrier immediately ahead of the pusher block. The pusher blocks are of a machineable material such as fiber so the cutter 6 can cut the top of the blocks to conform to the contour of the molding strips. As a block-receiving position of the carrier moves under the hopper, the blanks in the hopper are retained in position by a finger 60 carried on an arm 61 pivotally mounted on the shaft 62 carried by the frame members 53 with said arm 61 connected by a spring 63 to a bracket 64 mounted on the frame member 53 to bias the arm 61 whereby the finger 60 is moved under the lowermost blank in the hopper. Movement of the arm 61 to retract the finger 60 and allow a block to drop into the respective position on the carrier, is effected by a cam of sequence timing mechanism that is actuated in accordance with the rotation of the carrier. In the structure illustrated, there are diametrically opposed cam lobes 65 secured on the periphery of the cylindrical portion 32 of the carrier that are engaged by a cam follower or roller 66 mounted on the arm 61. When a lobe 65 engages the follower 66, the arm 61 is swung to retract the finger 60 whereby the stack of blanks will gravitate downwardly in the hopper depositing the lowermost blank on the surfaces 36 of the carrier. The lobe 65 then moves from under the follower 66 whereby the spring 63 causes the arm to swing to move the finger between the blank on the carrier and the next uppermost blank, said finger preferably being inclined as at 67 whereby said next uppermost blank is raised, lifting the stack to permit the blank on the table to pass freely thereunder.

In order that there be assurance that the blank is positioned properly on the carrier, there is an arcuate block guide 68 supported by brackets 69 from the platform 12 in radially outwardly spaced relation to the carrier ring 34 whereby a block or blank properly positioned on the carrier will have its outer corners engaging said arcuate guide 68 as the blank is pushed by the block 58 in the rotation of the carrier 4. When the blank is dropped onto the carrier from the hopper, it is pushed outwardly so the corners will engage the guide 68. This hold-back mechanism consists of a shoe 70 carried on the lower end of an arm 71 pivotally mounted in a bearing 72 that is supported by a bracket 73 mounted on a frame member 53 in upwardly spaced relation to the lower end of the hopper whereby said arm 71 is radially inwardly of the blanks in the hopper. The arm 71 is on a shaft 74 pivotally mounted in the bearing 72 and an actuating arm 75 extends from the other end of said shaft and is connected by a spring-biased lost motion connection 76 with the armature 77 of a solenoid 78 mounted on the web 55 of the hopper channel member 51. The solenoid 78 is energized by being connected into a suitable electric circuit by means of a micro switch 79 supported on the frame member 53 and adapted to be engaged by a cam lobe 80 on the cylindrical portion 32 of the carrier. The cam lobes 80 are also diametrically opposed and arranged whereby they will actuate the switch 79 in a proper sequence with the actuation of the finger 60. It is preferred that the shoe 70 be curved on a radius from the center or axis of rotation of the carrier when in its hold-back position so as not to vary the force applied to the blank as the blank moves with the carrier during the time it is engaged by the shoe 70.

As the blank moves with the carrier 4 from the blank-receiving position 48 or away from the hopper 50, the blank moves under a biased hold-down finger 81 that is pivotally mounted on a bracket 82 mounted on the hopper frame 53. The finger 81 has an arm 83 fixed relative thereto connected by a spring 84 to the platform 12 to bias the finger 81 downwardly toward the carrier ring 34. The finger 81 is positioned relative to the carrier 4 whereby when the blank is moving from under the hopper 50 is biased finger 81 will bear on the top surface of the blank 3 and force same downwardly to assure that the projections 37 penetrate into the bottom portion of the blank 3.

A blank hold-down structure 85 between the hopper and cutter 6 includes a hold-down shoe 86 having an undersurface 87 adapted to slidably engage the upper surface of the blank on the carrier. The shoe 86 preferably extends from adjacent the hopper 50 or finger 81 to adjacent the cutter 6 to hold the blank 3 on the carrier thereby preventing the engagement of the cutter with the blank from tending to dislodge the blank from its position. The hold-down shoe 86 is mounted for a limited movement and is biased downwardly toward the blank 3. In the structure illustrated, the shoe 86 is mounted on a slide member 88 that is preferably polygonal in cross-section and slidably mounted in a way 89 formed by a housing 90 carried on a bracket 91 fixed to the support or platform 12. The housing has an opening 92 extending longitudinally thereof through which an eye member 93 extends, said eye member being connected to the spring 94 which has its other end connected to an anchor 95 on the housing whereby the spring biases the shoe 86 downwardly toward the blank. A stop member 96 is fixed in the slide member 88 and extends into a slot 97 whereby the ends of the slot cooperate with the stop member to limit maximum reciprocation of the shoe 86. However, the downward movement of the shoe can be provided with a further limit by an adjusting screw 98 fixed in the slide member and extending through an aperture 99 in the upper part of the housing with stop members such as nuts 100 adjustably positioned thereon and adapted to engage the upper end of the housing to form a limit to downward movement of the shoe. With this adjustment, the shoe 86 can be accurately positioned whereby the blank 3 will pass thereunder and the shoe 86 be resiliently held against the blank 3.

Figure 3:
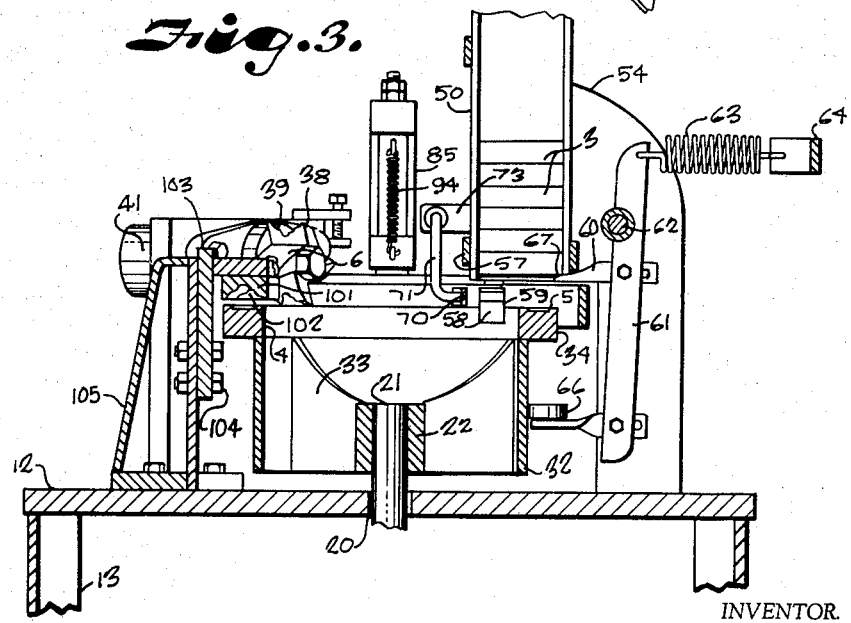
FIG. 3 is a partial vertical sectional view taken through the machine on the line 3—3, FIG. 2.

As the table 4 is rotated, the blank 3 thereon moves under the cutter 6 and as it emerges from under the cutter the cut portion of the blank passes under a molding hold-down shoe 101 which has its undersurface 102 shaped to conform to the cut of the top surface of the molding strip. The shoe 101 is fixed on a bracket member 103 which is secured by fastening devices 104 to a pedestal 105 mounted on the platform 12, as illustrated in FIG. 3. The bracket 103 is adjustable on the pedestal 105 whereby the shoe 101 will permit the cut molding strip to pass thereunder preferably with a slight sliding contact so as to hold the strip in place on the table as it moves to the discharge position 49. In the structure illustrated, the feed position 48 of the blank and the discharge position 49 are approximately 90-degrees apart and the cutter 6 is oppositely disposed or approximately 135-degrees from the feed position and the discharge position. At the discharge position 49, there is a chute 106 to receive the cut strips as they are moved from the table, said chute conveying the cut strips to a collecting zone or for further processing. At the discharge station, there is a kick-out foot 107 on a leg 108 that depends from and is pivotally mounted on a bearing 109 carried by an arm 110 that has one end fixed to the hopper frame 53 and extends inwardly and downwardly whereby the foot 107 is positioned inwardly and slightly above the carrier ring 34 and outward swinging movement of the foot will effect engagement with the cut strip, forcing same upwardly and outwardly to release the engagement of the projections 37 with the cut strip and thereby project the strip into the chute 106. The foot 107 is actuated by a solenoid 111 carried on a bracket 112 extending from the hopper frame 53, the solenoid armature 113 being connected by a link 114 to an arm 115 that is fixed relative to the leg 108. A spring 116 is connected to the solenoid armature and to the hopper frame 53 to bias the foot 107 inwardly from the ring 34 so there would be no engagement of the foot with the strip until the solenoid 111 is energized.

The timing sequence mechanism for the kick-off foot consists of cam lobes 1117 arranged in diametrically opposed relation on the cylindrical portion 32 of the table, and a micro switch 118 that is actuated by the cam lobes to complete an electric circuit to the solenoid 111 to energize same to effect the kick-off of the cut strip. After the cut strip is removed from the rotating table, the blank-receiving position of the table 4 is moved under the hopper 50 where another blank 3 is fed to the table and processed as described.

Figures 10, 12:
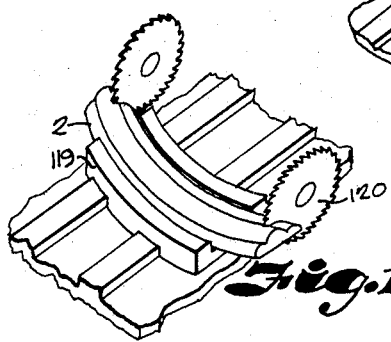
FIG. 10 is a diagrammatic perspective view of the arcuate strip being cut to length to form mitered ends.
FIG. 12 is a diagrammatic perspective view of the finished molding strip.
Figure 2:
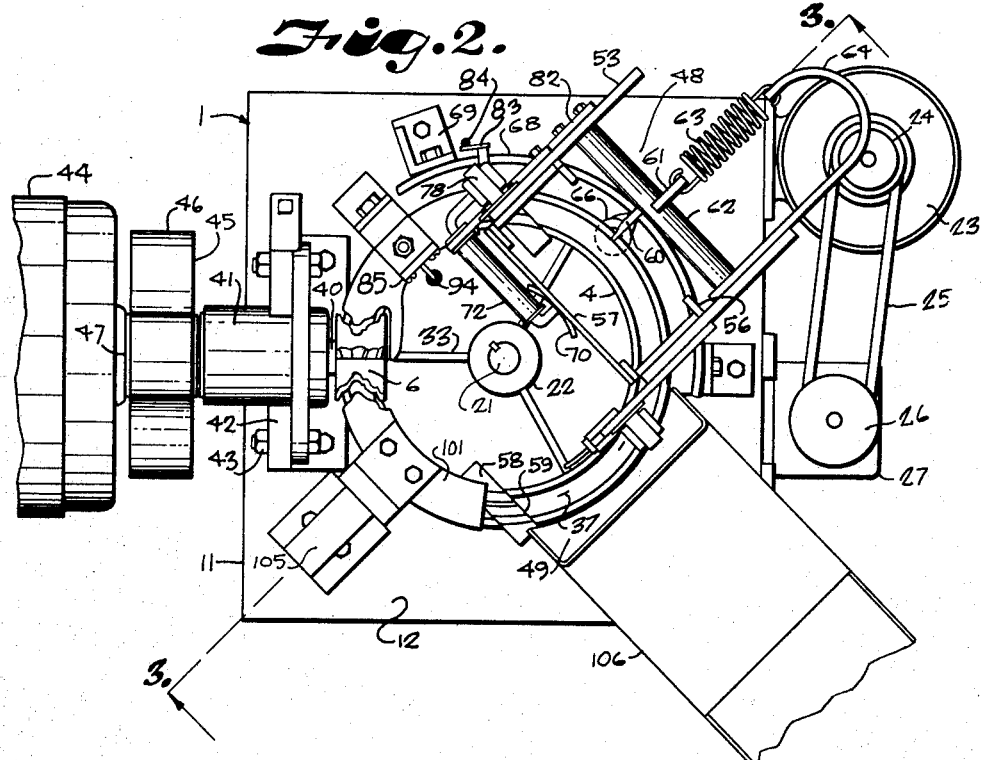
FIG. 2 is a plan view of the machine.

When the cut strip is removed from the machine 1, its ends are substantially parallel, but it is preferred that its length be slightly more than would provide for a 90-degree arc. Also, in the cutting of the top surface, there may tend to be a defect adjacent the ends. Therefore, in the method of making the strips, the cut strips are longer than desired and are cut to length. The cut strips are mounted on an arcuate receiver 119 and moved between spaced saws 120 that cut in parallel planes to thereby cut each end of the strip 2 to provide a 90-degree arc with mitered ends. The saws are moved from the inner arc of the strip toward the outer arc to reduce any possibility of breaking the small ends of the strip. While the strip is on the receiver 119, it is moved under spaced drills 121 providing spaced nail holes 122 in the finished molding strip, as illustrated in FIG. 12.

In the method used, a rectangular blank 3 is provided that has a longer length than the finished strip. The blank is held and moved in a circular path under a cutter to cut the sides and top to the desired contour and then the cut strip is passed between parallel saws to cut the molding strip to the desired length with parallel end faces, the cut being made from the inside out of the strip. The strip is then drilled to provide spaced anchor-receiving holes. In the cutting of the ends of the strip, the strip is so arranged relative to the saws that the radial center of the arc of the strip is equally spaced between the saws so that with a 90-degree arc the end faces form miter ends for mating with 45-degree miter ends of other strips. The shaping machine is substantially automatic, it being only necessary to close a switch to the electric circuit to energize the motors 29 and 44 and place the solenoid circuits under control of the switches 79 and 118. Then, by placing blanks in the hopper, the machine will shape the molding strips 2 and discharge same to the chute 106, as long as the supply of blanks remains in the hopper and the machine is continued to operate. The strips 2 are then quickly sawed and drilled to provide the finished molding strip.

It is believed that this apparatus and method assures finished molding strips of proper shape, smooth surface, with accurate mitered ends, and the grain running from end to end with substantially no breakage.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A machine for making arcuate molding strips from wood blanks comprising, a carrier mounted for rotation about a fixed vertical axis and having a blank-receiving position thereon, means for continuously rotating said carrier, means holding a stack of blanks to be fed to the carrier, means responsive to rotation of the carrier for effecting deposit of a blank one at a time to the blank-receiving position of the carrier, abutment means on the carrier at the blank-receiving position for engaging the trailing end of a respective blank positioned therein to move same with said rotating carrier in a circular path, a rotating cutter means above the carrier in circumferentially spaced relation to the blank-feeding means and in the path of blanks moved by the carrier, means driving said cutter means to cut the blank at the top and sides to the molding cross-sectional shape as the blank moves thereunder, means on the carrier and engaging the blank to retain same against movement forwardly relative to said carrier and said abutment means thereon, elongate means spaced above the carrier in the path of the blanks to the cutter and adapted to engage the blank to hold same down on the carrier as the blank is moved under the cutter by rotation of the carrier, and means for engaging the molding strip to separate same from the carrier subsequent to its passage under the cutter means.

2. A machine for making arcuate molding strips from wood blanks comprising, a carrier mounted for rotation about a fixed vertical axis and having circumferentially spaced blank-receiving positions, means for continuously rotating said carrier, means holding a stack of blanks to be fed to the carrier, means responsive to rotation of the carrier for effecting deposit of a blank one at a time to the respective blank-receiving positions of the carrier, abutment means on the carrier at the blank-receiving position for engaging the trailing end of a respective blank positioned therein to move same with said rotating carrier in a circular path, a rotating cutter means above the carrier in circumferentially spaced relation to the blank-feeding means and in the path of blanks moved by the carrier, means driving said cutter means to cut the blank at the top and sides to the molding cross-sectional shape as the blank moves thereunder, upstanding projections on the carrier engaging said blank between ends thereof, elongate means spaced above the carrier in the path of the blanks to and from the cutter and adapted to engage the blank and molding to hold same down on the carrier during movement of the blank under the cutter and cooperate with said upstanding projections to prevent relative movement of the blank and carrier, and means for engaging the molding strip to separate same from the carrier subsequent to its passage under the cutter means.

3. A machine as set forth in claim 2 wherein said upstanding projections are spaced on the carrier in the blank-receiving position and adapted to extend into said blank, and presser means resiliently biased toward the blank as it moves with the carrier from the hopper to urge the blank downwardly to engage the projections into said blank.

4. A machine as set forth in claim 3 having an arcuate guide spaced radially outwardly from the carrier and adapted to be engaged by a blank deposited on the carrier, said arcuate guide extending around the carrier to define an outer limit of the path of the blank from the deposited position toward the cutter means, and means including a pusher and a resilient connection for urging the deposited blank into engagement with said arcuate guide prior to the blank being urged by said presser means into engagement with said upstanding projections.

5. A machine as set forth in claim 4 and including a sequential timing means operative in accordance to rotation of the carrier for actuating the blank-depositing means as the carrier blank-receiving position moves under the stack holding means, and then the pusher means to move the deposited blank into engagement with the arcuate guide.

6. A machine for making arcutate molding strips from wood blanks comprising, a carrier mounted for rotation about a fixed vertical axis and having circumferentially spaced blank-receiving positions, means for continuously rotating said carrier to move said blank-receiving positions through a circular path from a receiving position through a cutting position to a discharge position, a hopper for holding a stack of blanks to be fed down upon said carrier at the feeding position, means responsive to rotation of the carrier for depositing a blank from said stack at the respective blank-receiving position on the carrier as it passes under the stack, abutment means fixed on said carrier at the trailing end of each of said blank-receiving positions for engaging the respective blank and moving same with the carrier, upstanding projections on the carrier at the blank-receiving positions and extending into a blank positioned thereon, a rotating cutter means above the carrier at said cutting position to cut the blank at the top and sides thereof to the molding cross-sectional shape as the blank moves thereunder, a hold-down shoe in fixed space relation to the carrier and contoured to engage the shapped upper surface of the molding as it moves from under the cutter means and hold same against the carrier as the molding emerges from under the cutter means and cooperate with said upstanding projections to prevent relative movement of the molding blank and carrier, and means at the discharge position and actuated in response to rotation of the carrier to push the cut molding from the carrier.

7. A machine for making arcuate molding strips from wood blanks comprising, a carrier mounted for rotation about a fixed vertical axis and having circumferentially spaced blank-receiving positions, means for continuously rotating said carrier to move said blank-receiving positions through a circular path from a receiving position through a cutting position to a discharge position, a hopper for holding a stack of blanks to be fed down upon said carrier at the feeding position, means responsive to rotation of the carrier for depositing a blank from said stack at the respective blank-receiving position on the carrier as it passes under the stack, abutment means fixed on said carrier at each of said blank-receiving positions for engaging the trailing end of the respective blank and moving same with the carrier, a rotating cutter means above the carrier at said cutting position to cut the blank at the top and sides thereof to the molding cross-sectional shape as the blank moves thereunder, means on the carrier and engaging the blank to retain same against movement forwardly relative to the carrier and abutment means thereon, a resiliently biased hold-down shoe adjacent the cutter means and having limited movement toward the carrier to engage the blank and hold same against the carrier as the blank is moved to the cutter position, a hold-down shoe in spaced relation from the carrier and contoured to engage the shaped upper surface of the molding as it moves from under the cutter means, and means at the discharge position and actuated in response to rotation of the carrier to push the cut molding from the carrier.

8. A machine for making arcuate molding strips from wood blanks comprising, a carrier mounted for rotation about a fixed vertical axis and having circumferentially spaced blank-receiving positions, means for continuously rotating said carrier to move said blank-receiving positions through a circular path from a receiving position through a cutting position to a discharge position, a hopper for holding a stack of blanks to be fed down upon said carrier at the feeding position, means responsive to rotation of the carrier for depositing a blank from said stack at the respective blank-receiving position on the carrier as it passes under the stack, abutment means fixed on said carrier at the trailing end of each of said blank-receiving positions for engaging the respective blank and moving same with the carrier, a rotating cutter means above the carrier at said cutting position to cut the blank at the top and sides thereof to the molding cross-sectional shape as the blank moves thereunder, upstanding means engaging the blank between ends thereof, a resiliently biased hold-down shoe extending from adjacent the hopper to adjacent the cutter means and having limited movement toward the carrier to engage the blank and hold same against the carrier as the blank is moved from the hopper to the cutter position, a hold-down shoe in fixed spaced relation to the carrier and contoured to engage the shaped upper surface of the molding as it moves from under the cutter means to cooperate with said upstanding means to prevent relative movement of the molding and carrier by the cutting action of said cutter means, said fixed hold-down shoe extending from close proximity with the cutter means to adjacent the discharge position, and means at the discharge position and actuated in response to rotation of the carrier to push the cut molding from the carrier.

9. A machine as set forth in claim 8 wherein said upstanding means are projections spaced on the carrier in the blank-receiving position and adapted to extend into said blank, and means resiliently biased toward the bank as the engagement of said abutment means with said blank in response to rotation of the carrier moves the blank from under the stack in the hopper to urge the blank downwardly to engage the projections into said blank.

10. A machine as set forth in claim 9 having an arcuate guide spaced radially outwardly from the carrier and adapted to be engaged by a blank deposited on the carrier, said arcuate guide extending around the carrier to define an outer limit of the path of the blank from the deposited position to the hold-down shoe between the hopper and cutter means, means including a pusher and a resilient connection for urging the deposited blank into engagement with said arcuate guide prior to the engagement of the blank with said projections in response to urging of said resiliently biased means, and a sequential timing means operative in accordance to rotation of the carrier for actuating the blank-depositing means and the pusher means.

References Cited by the Examiner

UNITED STATES PATENTS

| | | | |
|---|---|---|---|
| 128,289 | 6/72 | Dewing | 144—154 |
| 1,727,513 | 9/29 | Maloon | 144—154 |
| 1,835,528 | 12/31 | Roe | 144—154 |
| 1,918,516 | 7/33 | Brown | 144—326 |
| 2,045,390 | 6/36 | Howe | 144—154 |
| 2,120,501 | 6/38 | May | 93—1 |
| 2,202,082 | 5/40 | Berkstresser | 144—154 |
| 2,603,258 | 7/52 | Grondahl et al. | 144—154 |
| 2,952,105 | 9/60 | Schur | 93—1 |
| 2,987,088 | 6/61 | Dennison | 144—326 |

FOREIGN PATENTS

| | | |
|---|---|---|
| 1,191,762 | 4/59 | France. |
| 429,000 | 5/26 | Germany. |

ROBERT C. RIORDON, *Primary Examiner.*

WILLIAM W. DYER, JR., *Examiner.*